United States Patent
Fujisawa

(10) Patent No.: US 10,251,039 B2
(45) Date of Patent: Apr. 2, 2019

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Minoru Fujisawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 14/961,671

(22) Filed: Dec. 7, 2015

(65) Prior Publication Data

US 2016/0165385 A1 Jun. 9, 2016

(30) Foreign Application Priority Data

Dec. 9, 2014 (JP) .................................. 2014-249434

(51) Int. Cl.
*H04W 4/80* (2018.01)
*H04L 12/24* (2006.01)

(52) U.S. Cl.
CPC .......... *H04W 4/80* (2018.02); *H04L 41/0806* (2013.01); *H04L 41/0883* (2013.01); *H04L 41/12* (2013.01); *H04L 41/0886* (2013.01)

(58) Field of Classification Search
CPC ....... H04B 5/0031; H04L 41/22; H04W 4/008
USPC .............................................. 455/41.1, 41.2
See application file for complete search history.

(56) References Cited

U.S. PATENT DOCUMENTS

| 8,526,885 | B2* | 9/2013 | Lin | H04M 1/7253 |
| | | | | 340/12.51 |
| 2007/0182984 | A1* | 8/2007 | Ragnet | G06F 21/608 |
| | | | | 358/1.15 |
| 2009/0170431 | A1* | 7/2009 | Pering | H04B 5/02 |
| | | | | 455/41.1 |
| 2013/0081121 | A1* | 3/2013 | Green | H04L 9/0827 |
| | | | | 726/7 |
| 2013/0088354 | A1* | 4/2013 | Thomas | A61B 90/96 |
| | | | | 340/572.1 |
| 2013/0176956 | A1* | 7/2013 | Yamamoto | H04W 76/021 |
| | | | | 370/329 |
| 2013/0258382 | A1* | 10/2013 | Sato | H04N 1/00106 |
| | | | | 358/1.13 |
| 2014/0185097 | A1* | 7/2014 | Shiraga | G06F 3/1292 |
| | | | | 358/1.15 |
| 2014/0293333 | A1* | 10/2014 | Asai | G06F 3/1236 |
| | | | | 358/1.15 |
| 2015/0092607 | A1* | 4/2015 | Ando | H04L 41/0893 |
| | | | | 370/255 |

(Continued)

FOREIGN PATENT DOCUMENTS

JP 2013-157736 A 8/2013

*Primary Examiner* — Lewis G West
(74) *Attorney, Agent, or Firm* — Canon U.S.A., Inc. IP Division

(57) ABSTRACT

If an information processing apparatus obtains a plurality of pieces of connection from a near field communication tag, the information processing apparatus displays a selection screen via which a piece of connection information is selected from among the plurality of pieces of connection information. If a piece of connection information is selected, the information processing apparatus establishes wireless communication based on the selected connection information.

9 Claims, 9 Drawing Sheets

(56) References Cited

U.S. PATENT DOCUMENTS

2016/0034887 A1\* 2/2016 Lee .......................... G09G 5/12
                                                                         705/39

\* cited by examiner

FIG. 4A

SETTING SCREEN
400

NFC TAG SETTING

SET ACCESS POINT INFORMATION.

SSID: [           ] ~ 401

CONNECTION KEY: [           ] ~ 402

[ REGISTER ] ~ 403

404

[ CONFIRM REGISTERED CONTENTS ]    [ RETURN ]

FIG. 4B

ACCESS POINT INFORMATION TABLE
410

| SSID | CONNECTION KEY |
|---|---|
| AAAA | abcdefg |
| BBBB | 1234567 |

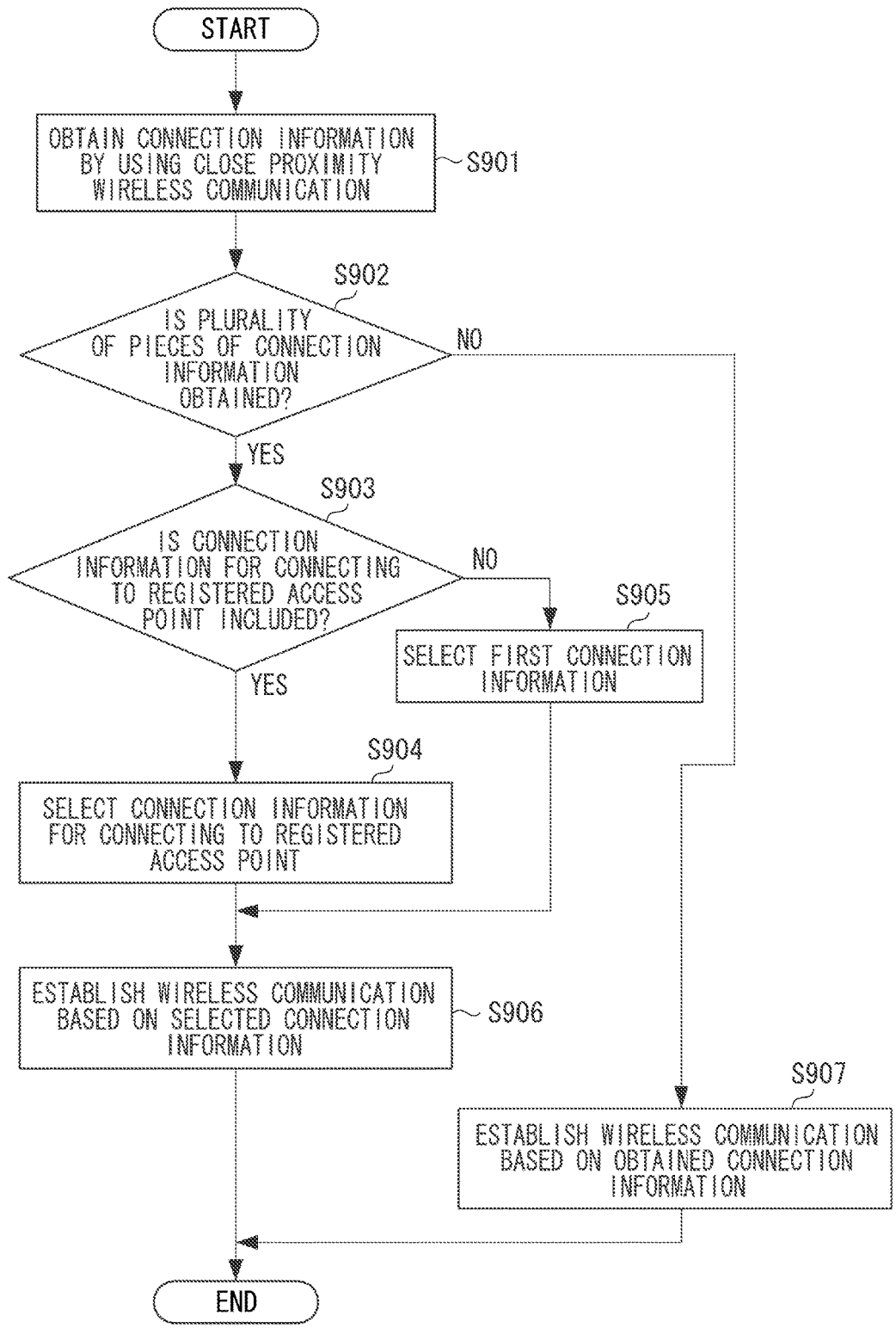

INFORMATION PROCESSING APPARATUS, METHOD FOR CONTROLLING INFORMATION PROCESSING APPARATUS, AND STORAGE MEDIUM

BACKGROUND

Field

Aspects of the present invention generally relate to an information processing apparatus that performs near field radio communication.

Description of the Related Art

Portable terminals such as smartphones or tablet personal computers (PC) include a wireless communication function. One of the uses of such a wireless communication function, for example, is to transmit a picture or an electronic document stored in the portable terminal to a printer using wireless communication and cause the printer to print out the picture or electronic document.

To cause a portable terminal to perform wireless communication with an external apparatus, such as a printer, the portable terminal needs to connect to an access point to establish wireless communication. As a method for establishing wireless communication, a handover using near field communication (NFC) has been known (Japanese Patent Application Laid-Open No. 2013-157736). A handover refers to a method for obtaining connection information needed to perform wireless communication (for example, a service set identifier (SSID) of the access point) by using near field radio communication such as NFC, and establishing wireless communication based on the obtained connection information. For the user, the handover enables wireless communication between the portable terminal and the external apparatus by simply bringing the portable terminal close to the external apparatus or by simply touching the external apparatus with the portable terminal.

If NFC is used to perform a handover, the external apparatus stores connection information in its NFC tag. A conventional NFC tag stores a single piece of connection information. The portable terminal obtains the connection information from the NFC tag and performs the handover. Depending on the use environment of the user of the portable terminal, a plurality of pieces of connection information needs to be stored instead of a single piece of connection information. For example, in an office environment, a plurality of access points may be provided. There is therefore a need to store the SSIDs of each of the plurality of access points in an NFC tag. However, in conventional portable terminals, it is not assumed that a plurality of pieces of connection information is obtained by NFC, and appropriate processing cannot be performed if a plurality of pieces of connection information is obtained by NFC.

SUMMARY

Aspects of the present invention are directed to providing a mechanism by which appropriate processing can be performed even if an information processing apparatus such as a portable terminal obtains a plurality of pieces of connection information by near field radio communication.

According to an aspect of the present invention, an information processing apparatus that performs NFC includes an acquisition unit configured to obtain connection information from an NFC tag by using the NFC, a determination unit configured to determine whether the acquisition unit has obtained a plurality of pieces of connection information from the NFC tag, a display unit configured to, if the determination unit determines that the acquisition unit has obtained a plurality of pieces of connection information, display a selection screen via which single connection information can be selected from among the plurality of pieces of connection information, and a wireless communication unit configured to establish wireless communication based on the connection information selected the selection screen.

Further features of the present disclosure will become apparent from the following description of exemplary embodiments with reference to the attached drawings.

BRIEF DESCRIPTION OF THE DRAWINGS

FIGS. 4A and 4B are diagrams for describing access point information.

FIG. 9 is a flowchart illustrating processing related to a handover.

DESCRIPTION OF THE EMBODIMENTS

Exemplary embodiments for carrying out aspects of the present invention will be described below with reference to the drawings. The exemplary embodiments are not intended to limit aspects of the invention set forth in the claims, and all combinations of features described in the exemplary embodiments are not necessarily needed.

Figure 1:
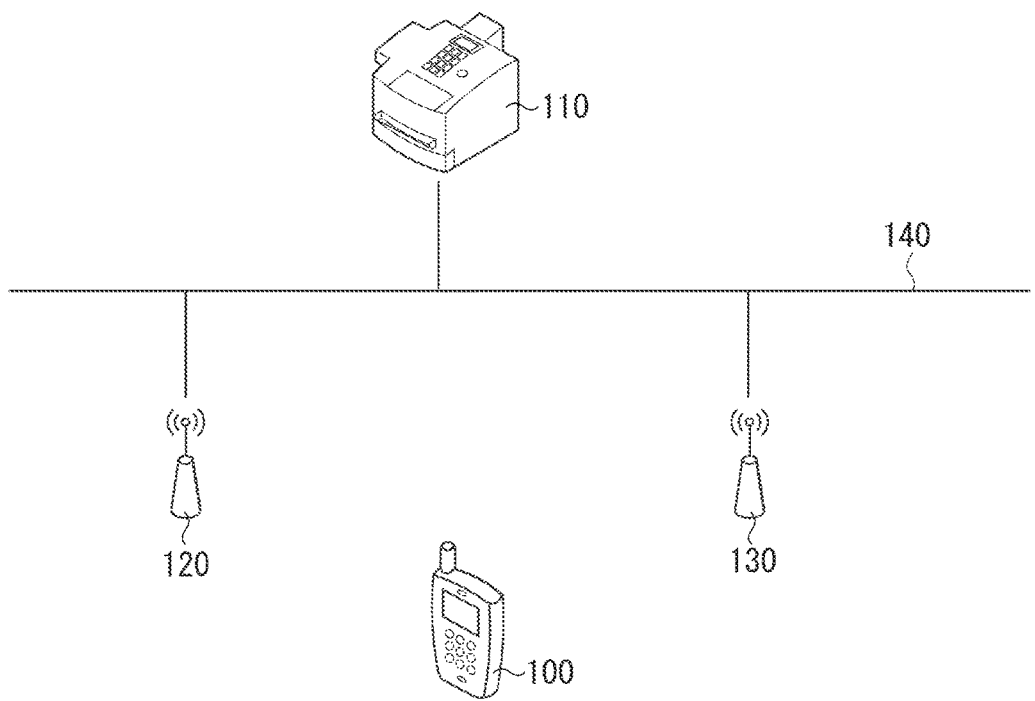
FIG. 1 is a diagram illustrating a configuration of a printing system.

A first exemplary embodiment will be described below. A configuration of an entire printing system will be described with reference to FIG. 1. The printing system includes a portable terminal 100, a printing apparatus 110, and access points. In the present exemplary embodiment, the printing system includes two access points (access points 120 and 130). However, the number of access points is not limited to two.

The printing apparatus 110 is connected to a network 140, and can communicate with an external apparatus such as a PC on the network 140. The printing apparatus 110 also performs wireless communication, such as Wi-Fi, with the access points 120 and 130.

The portable terminal 100 can perform wireless communication such as Wi-Fi. If the user inputs an SSID and a connection key of an access point (access point 120 or 130) into the portable terminal 100, the portable terminal 100 connects to the access point. The portable terminal 100 then can communicate with the printing apparatus 110 via the access point. The portable terminal 100 can transmit a print job to the printing apparatus 110 via the access point. When the print job is received, the printing apparatus 110 performs print processing.

The portable terminal 100 and the printing apparatus 110 can perform near field radio communication such as NFC. In the present exemplary embodiment, the printing apparatus 110 includes an NFC tag. Connection information for connecting to the access points 120 and 130 (the SSIDs and connection keys of the access points 120 and 130) is stored in the NFC tag. The portable terminal 100 can obtain the connection information stored in the NFC tag of the printing apparatus 110 by using NFC, and connect to the access points 120 and 130 based on the obtained connection information. The switching of communication to wireless communication such as Wi-Fi by using the connection information obtained in the near field radio communication such as NFC is referred to as a handover. The handover saves the user the trouble of inputting the connection information into the portable terminal 100 to connect to the access points 120 and 130 (the SSIDs and the connection keys of the access points 120 and 130).

While the present exemplary embodiment is described by using NFC as an example of the near field radio communication, the type of the near field radio communication is not limited to NFC. Another example is Bluetooth®.

Figure 2:
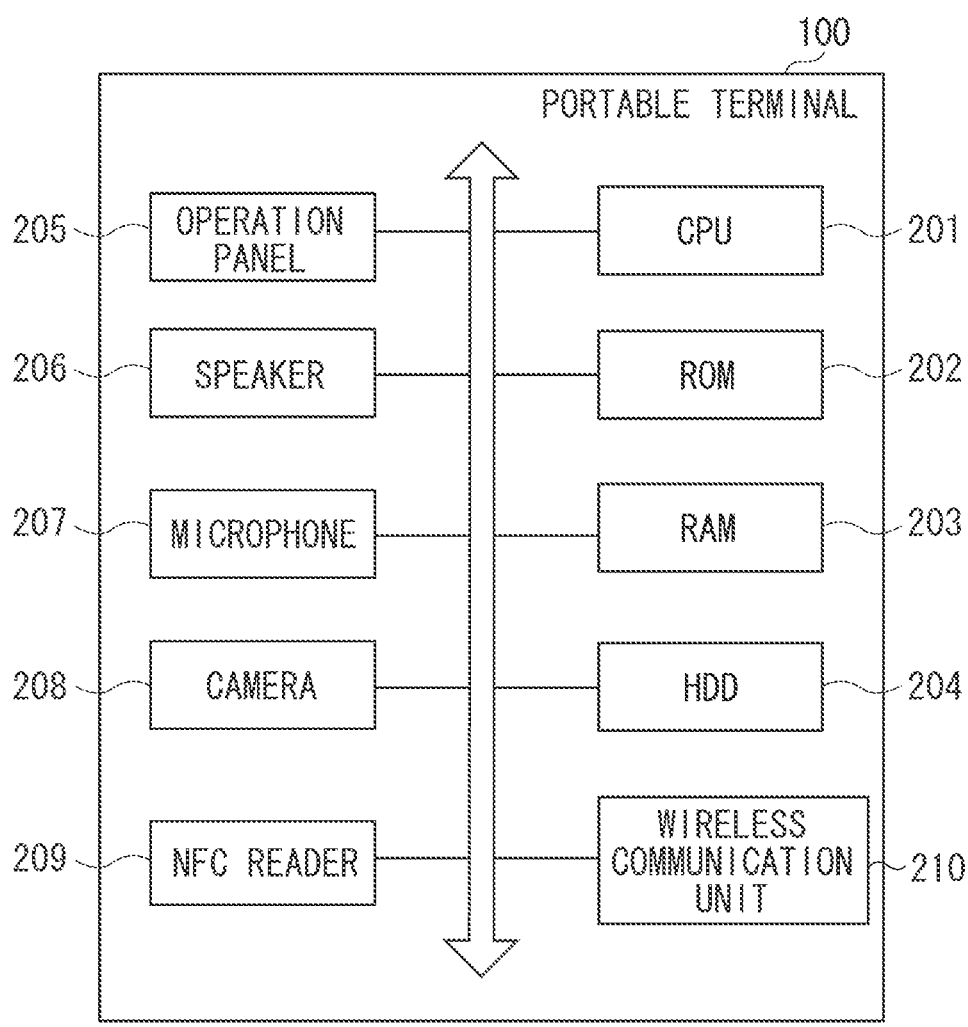
FIG. 2 is a diagram illustrating a configuration of a portable terminal.

Next, a configuration of the portable terminal 100 will be described with reference to FIG. 2. The portable terminal 100 according to the present exemplary embodiment is assumed to be an apparatus such as a smartphone and a tablet PC. However, the portable terminal 100 may be other information apparatuses that can perform wireless communication. An example of other information apparatuses is a digital camera having a wireless communication function.

A central processing unit (CPU) 201 reads a control program stored in a read-only memory (ROM) 202 and performs various types of processing for controlling an operation of the portable terminal 100. The ROM 202 stores the control program. A random access memory (RAM) 203 is used as a temporary storage area such as a main memory and a work area of the CPU 201. A hard disk drive (HDD) 204 stores various types of data such as pictures and electronic documents.

In the case of the portable terminal 100, the processes illustrated in the flowchart described below are performed by a single CPU 201. However, other embodiments may be employed. For example, a plurality of CPUs may cooperate to perform the processes illustrated in the flowchart described below.

An operation panel 205 includes a touch panel that can detect a touch operation of the user, and displays various screens. The user can input a touch operation to the operation panel 205 and thereby input a desired instruction to the portable terminal 100. The portable terminal 100 may include a not-illustrated hardware key, and the user may input an instruction to the portable terminal 100 by using the hardware key.

A speaker 206 and a microphone 207 are used when the user makes a phone call to another portable terminal or a fixed-line phone. A camera 208 captures an image according to an instruction of the user. Pictures captured by the camera 208 are stored in a predetermined area of the HDD 204.

An NFC reader 209 performs wireless communication based on NFC, and obtains information stored in an NFC tag. In the present exemplary embodiment, the printing apparatus 110 includes an NFC tag. If the user brings the portable terminal 100 close to the NFC tag of the printing apparatus 110, the NFC reader 209 reads the information stored in the NFC tag of the printing apparatus 110.

A wireless communication unit 210 performs wireless communication such as Wi-Fi. In the case of the portable terminal 100, a handover enables the user to perform the wireless communication of the wireless communication unit 210 with a simple operation.

Specifically, the wireless communication unit 210 connects to an access point and establishes wireless communication by using the connection information (SSID and connection key of the access point) that is obtained from the NFC tag of the printing apparatus 110 by the NFC reader 209.

Figure 3:
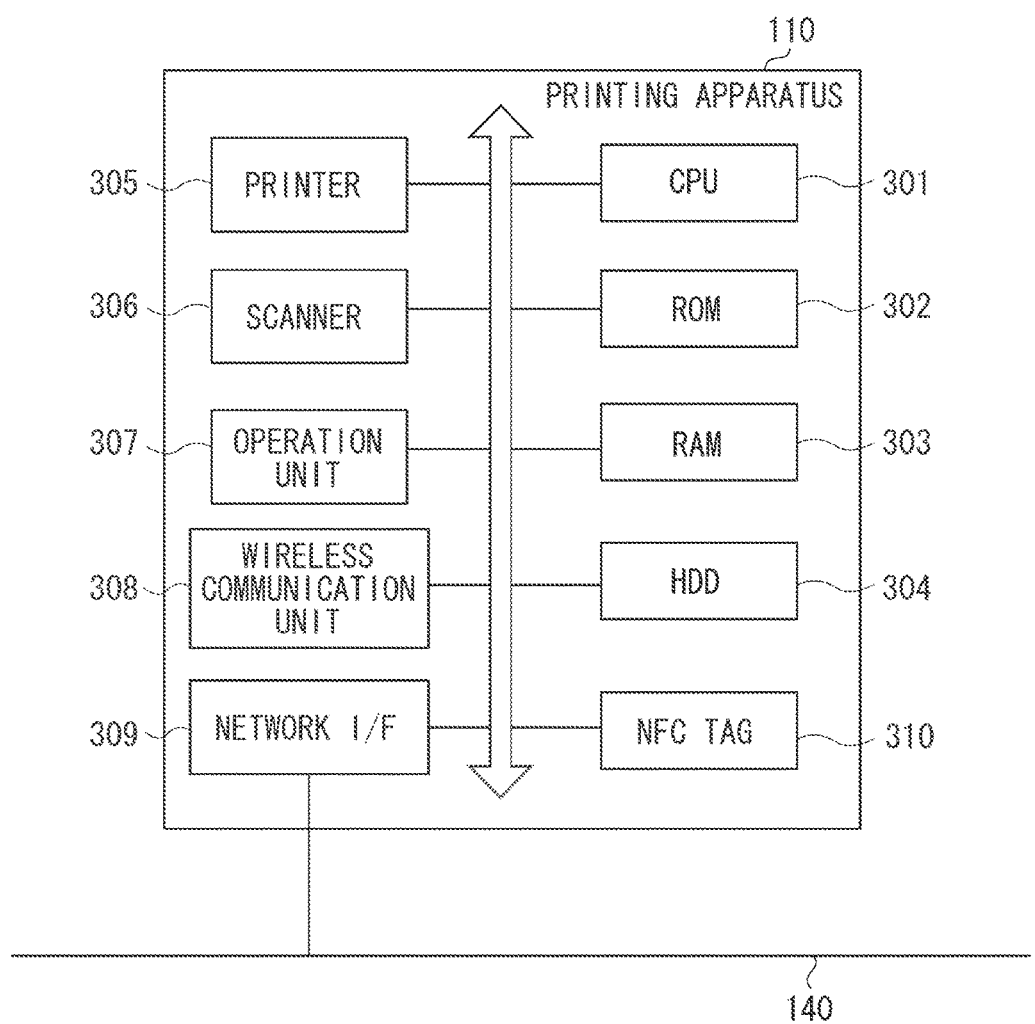
FIG. 3 is a diagram illustrating a configuration of a printing apparatus.

Next, a configuration of the printing apparatus 110 will be described with reference to FIG. 3. The printing apparatus 110 according to the present exemplary embodiment is assumed to be a multifunction peripheral. However, the printing apparatus 110 may be a printer without a scanner function.

A CPU 301 reads a control program stored in a ROM 302 and performs various types of processing for controlling an operation of the printing apparatus 110. The ROM 302 stores the control program. A RAM 303 is used as a temporary storage area such as a main memory and a work area of the CPU 301. A HDD 304 stores various types of data such as a print job and a scanned image.

A printer 305 performs print processing on a sheet based on a print job received from an external apparatus or a scanned image generated by a scanner 306. The scanner 306 reads a document to generate a scanned image. The scanned image generated by the scanner 306 is printed by the printer 305 and/or stored in the HDD 304.

An operation unit 307 includes a liquid crystal display unit having a touch panel function, and a keyboard. The operation unit 307 displays various screens. The user can input instructions and information to the printing apparatus 110 via the operation unit 307.

A wireless communication unit 308 performs wireless communication such as Wi-Fi with an external apparatus.

A network interface (I/F) 309 is connected to the network 140 via a local area network (LAN) cable, and performs communication with an external apparatus.

An NFC tag 310 stores tag information. The NFC tag 310 includes a not-illustrated nonvolatile memory. The tag information is stored in the nonvolatile memory. The tag information stored in the NFC tag 310 is read by the NFC reader 209. The tag information includes various types of information. For example, the tag information includes activation information for activating a desired application on the portable terminal 100 and a universal resource locator (URL) for a web browser of the portable terminal 100 to access. In the present exemplary embodiment, the tag information includes connection information needed for the portable terminal 100 to perform a handover.

In the present exemplary embodiment, the user can set from the printing apparatus 110 the access point for the portable terminal 100 to connect to when performing a handover. FIG. 4A illustrates a setting screen 400 which the operation unit 307 of the printing apparatus 110 displays. The user uses the setting screen 400 to set access point information.

The user inputs the SSID of the access point to an item 401. In the present exemplary embodiment, the SSID of the access point 120 or 130 is input to the item 401. If a connection key is needed to connect to the access point 120 or 130, the user inputs the connection key to an item 402. If the user selects a registration button 403, the information input to the items 401 and 402 is stored into the HDD 304 of the printing apparatus 110.

FIG. 4B illustrates an access point information table 410 which is information stored in the HDD 304 of the printing apparatus 110. The access point information table 410 manages access point information. The information managed by the access point information table 410 is stored into the NFC tag 310. In the present exemplary embodiment, a plurality of pieces of access point information can be stored in the access point information table 410. The access point information table 410 of FIG. 4B illustrates a case where two pieces of access point information are managed.

For example, in an office environment, the user (system administrator) may want to use a plurality of access points in the office as access points to connect to a handover. In such a case, the user can set access point information about each of the plurality of access points by using the setting screen 400. If the user selects a confirmation button 404 of the setting screen 400, a confirmation screen for confirming the access point information managed by the access point information table 410 is displayed on the operation unit 307. On the confirmation screen, the user can correct or delete the access point information managed by the access point information table 410.

Figures 5A, 5B:
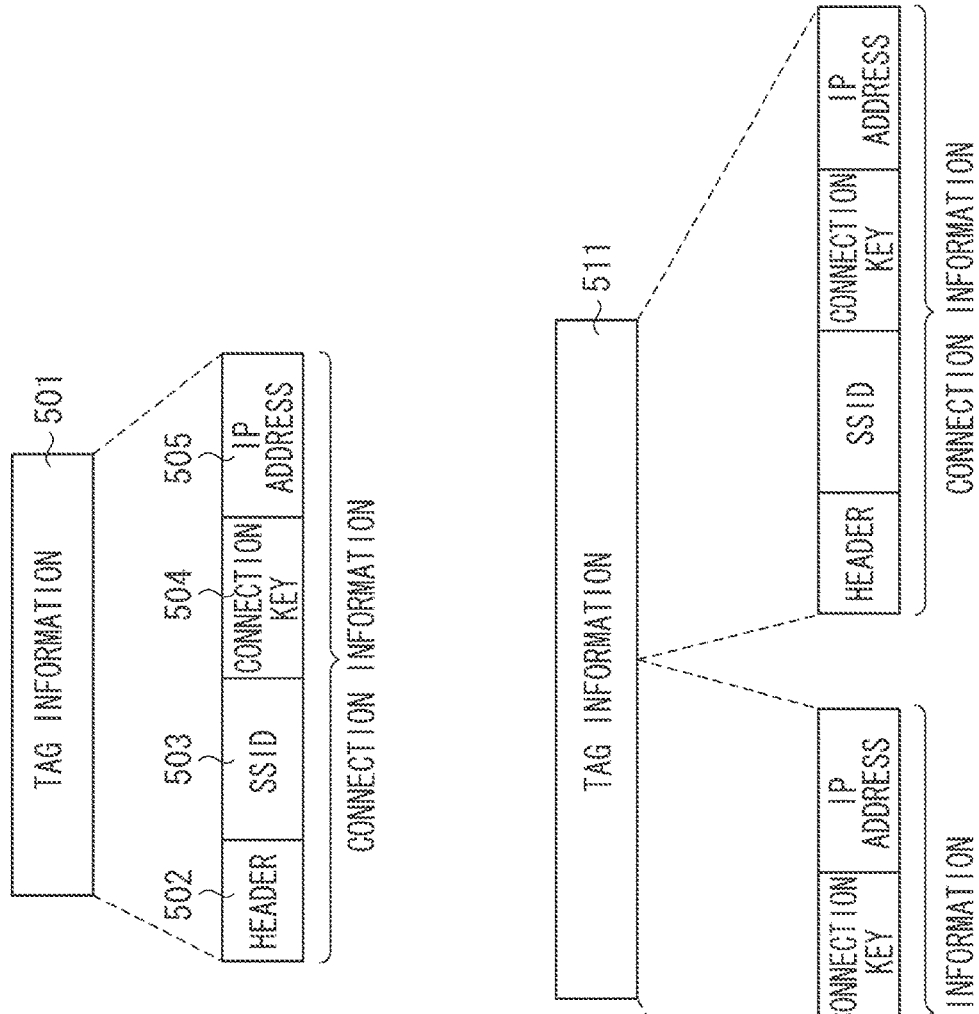
FIGS. 5A and 5B are diagrams illustrating a configuration of tag information.

FIGS. 5A and 5B are diagrams illustrating a configuration of the tag information stored in the NFC tag 310. The tag information is described in a format called NFC Data Exchange Format (NDEF) defined by the NFC Forum. The tag information is generated by the CPU 301 of the printing apparatus 110 based on the access point information managed by the access point information table 410.

FIG. 5A illustrates tag information 501 which is an example of tag information including a single piece of connection information. The tag information 501 of FIG. 5A is generated if a single piece of access point information is managed by the access point information table 410. The connection information includes a header 502, an SSID 503, a connection key 504, and an Internet Protocol (IP) address 505. The SSID 503 and the connection key 504 are identified by the access point information managed by the access point information table 410. The IP address 505 is the IP address of the printing apparatus 110. The IP address is used as a destination address when the portable terminal 100 transmits a print job to the printing apparatus 110.

FIG. 5B illustrates tag information 511 which is an example of tag information including two pieces of connection information. The tag information 511 of FIG. 5B is generated if two pieces of access point information are managed by the access point information table 410.

While the tag information illustrated in FIGS. 5A and 5B includes only connection information, the tag information may further include activation information for activating a desired application on the portable terminal 100 and an URL which the web browser of the portable terminal 100 accesses.

Figure 6:
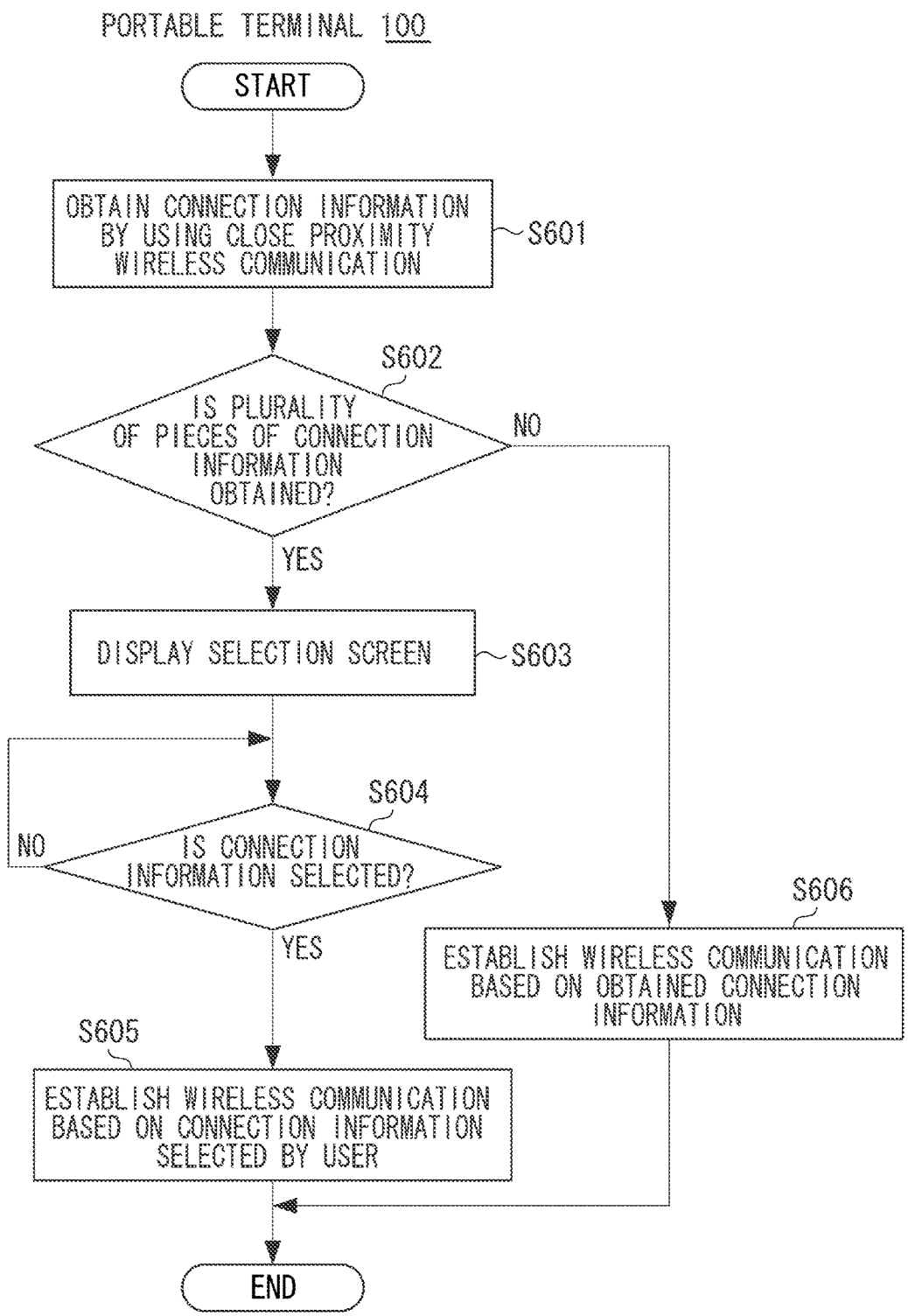
FIG. 6 is a flowchart illustrating processing related to a handover.

Next, processing related to a handover performed by the portable terminal 100 will be described with reference to the flowchart of FIG. 6. The steps illustrated in the flowchart of FIG. 6 are processed by the CPU 201 loading the control program stored in a memory such as the ROM 202 into the RAM 203 and executing the control program.

If the user brings the portable terminal 100 close to the NFC tag 310 of the printing apparatus 110 (touches the NFC tag 310 of the printing apparatus 110 with the portable terminal 100), the NFC reader 209 of the portable terminal 100 detects the NFC tag 310. In step S601, the CPU 201 obtains the connection information stored in the NFC tag 310 by using near field radio communication. More specifically, in step S601, the NFC reader 209 reads the tag information stored in the NFC tag 310 by using NFC. The CPU 201 then analyzes the tag information read by the NFC reader 209, whereby the CPU 201 obtains the connection information included in the tag information.

In step S602, the CPU 201 determines whether a plurality of pieces of connection information is obtained from the NFC tag 310. If the tag information read from the NFC tag 310 includes a plurality of pieces of connection information, then in step S602, a decision is made based on a plurality of pieces of the obtained connection information (YES in step S602), and the processing proceeds to step S603. On the other hand, if the tag information read from the NFC tag 310 includes a single piece of connection information, then in step S602, it is determined that a plurality of pieces of connection information has not been obtained (NO in step S602), and the processing proceeds to step S606.

Next, step S606 will be described. In step S606, the CPU 201 controls the wireless communication unit 210 to establish wireless communication based on the connection information obtained from the NFC tag 310. In the case of step S606, the number of pieces of connection information obtained from the NFC tag 310 is one. The wireless communication unit 210 connects to the SSID included in the connection information by using the connection key included in the connection information. For example, if the SSID included in the connection information is that of the access point 120, then in step S606, wireless communication between the portable terminal 100 and the access point 120 is established.

Next, step S603 will be described. If a plurality of pieces of connection information is obtained from the NFC tag 310, the portable terminal 100 needs to select a single piece of connection information to be used for a handover from among the plurality of pieces of connection information. The present exemplary embodiment is characterized in that the user selects the connection information to be used.

Figure 7:
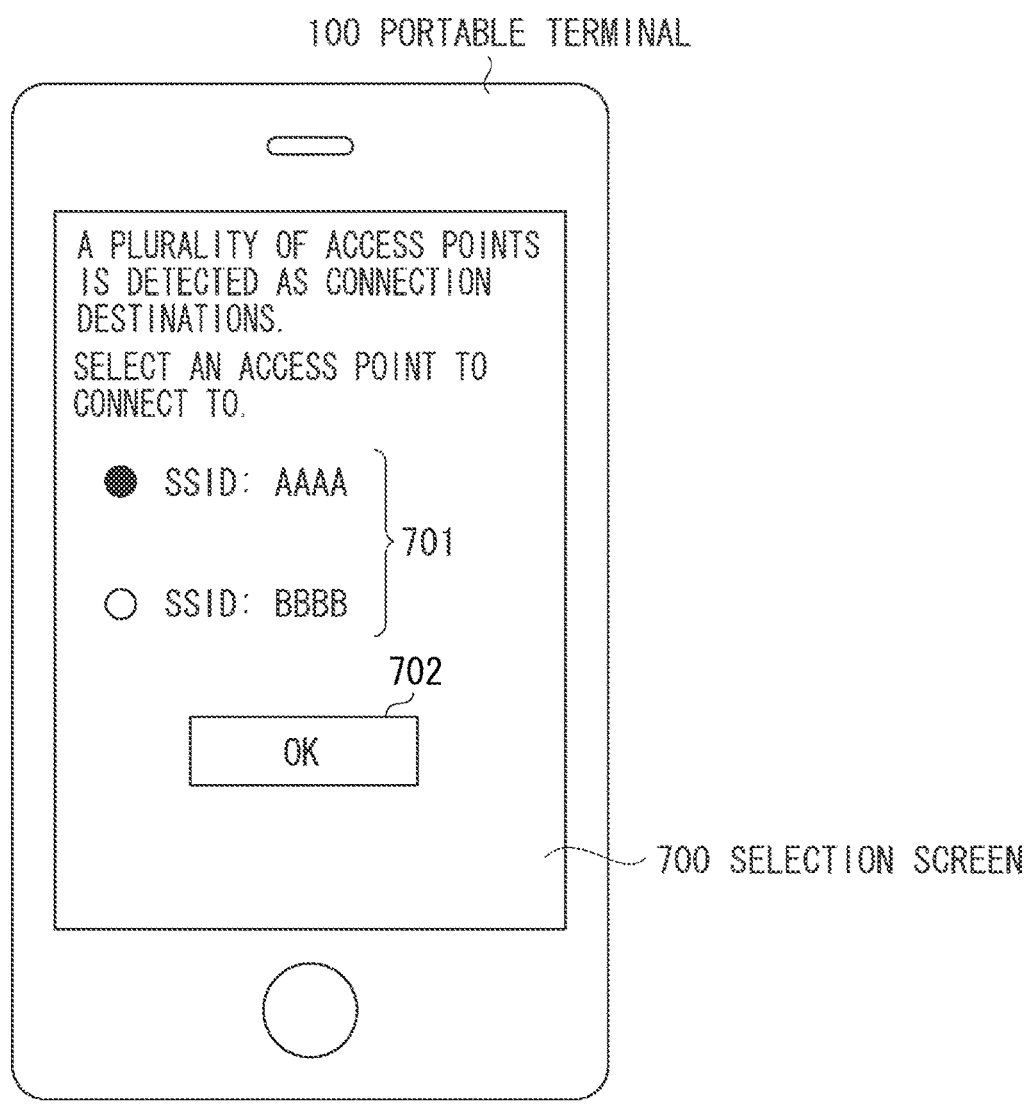
FIG. 7 is a diagram illustrating a selection screen for selecting a piece of connection information from among a plurality of pieces of connection information.

In step S603, the operation panel 205 displays a selection screen 700 illustrated in FIG. 7. The selection screen 700 is a screen for the user to select desirable connection information from among the plurality of pieces of connection information obtained from the NFC tag 310. An area 701 displays the SSIDs indicated by the plurality of pieces of connection information obtained from the NFC tag 310. The selection screen 700 illustrates an example where two pieces of connection information are obtained from the NFC tag 310. The user selects a desirable SSID from among the plurality of SSIDs displayed in the area 701. If the user selects an OK button 702, connection information to be used for a handover is determined among the plurality of pieces of connection information.

In step S604, the CPU 201 determines if the connection information is selected by the user. If the user selects the desirable SSID and presses the OK button 702 on the selection screen 700, the CPU 201 determines that connection information is selected by the user (YES in step S604), and the processing proceeds to step S605. On the other hand, if the connection information is not selected by the user (NO in step S604), the CPU 201 waits until the user selects the connection information.

Step S605 will be described. In step S605, the CPU 201 controls the wireless communication unit 210 to establish wireless communication based on the connection information selected by the user. The wireless communication unit 210 connects to the SSID included in the connection information selected by the user, by using the connection key included in the connection information selected by the user.

As described above, according to the present exemplary embodiment, the printing apparatus 110 can store a plurality of pieces of connection information in the NFC tag 310. For example, if there is a plurality of access points, for example, in an office environment, the connection information about each of access points can thus be stored in the NFC tag 310.

With respect to the portable terminal 100, even if a plurality of pieces of connection information is obtained from the NFC tag 310, the portable terminal 100 can use the connection information according to the selection by the user of the portable terminal 100. The portable terminal 100 can thus perform an appropriate handover, reflecting the intention of the user of the portable terminal 100.

In steps S605 and S606 of FIG. 6, the wireless communication unit 210 establishes wireless communication, and the processing ends. However, other modes may be employed. For example, if the user brings the portable terminal 100 close to the NFC tag 310 with a print target picture selected by the user, the portable terminal 100 may automatically transmit a print job to print the selected picture to the printing apparatus 110 in response to the establishment of the wireless communication. The print job is transmitted by using the wireless communication established in step S605 or S606. When the print job is received, the printing apparatus 110 performs print processing of the selected picture based on the received print job.

A second exemplary embodiment will be described below. The first exemplary embodiment has dealt with the configuration in which if a plurality of pieces of connection information is obtained from the NFC tag 310, the user selects the connection information to be used. In contrast, the present exemplary embodiment describes a configuration in which if a plurality of pieces of connection information is obtained from the NFC tag 310, the connection information to be used is automatically selected based on previously registered information.

Figure 8:
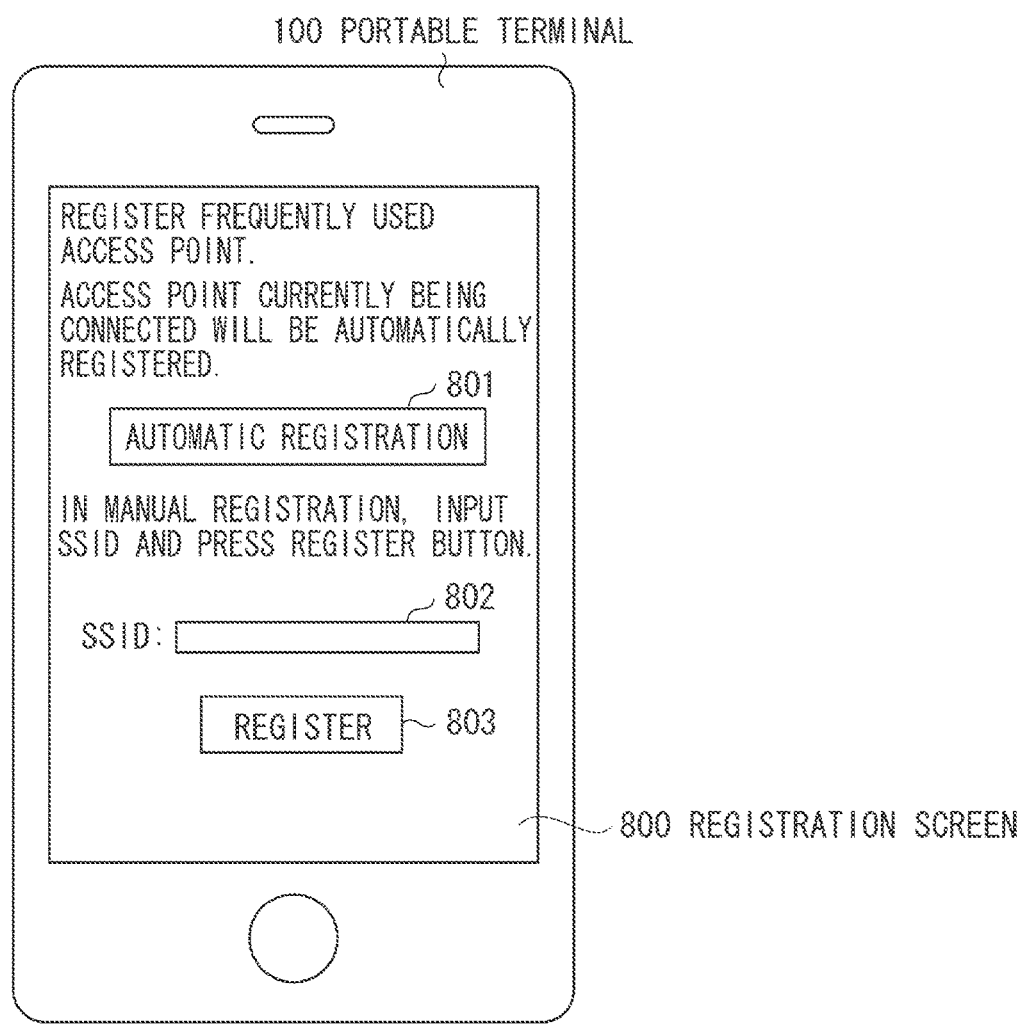
FIG. 8 is a diagram illustrating a registration screen for registering a frequently-used access point.

FIG. 8 illustrates a registration screen 800 which is a screen displayed on the operation panel 205 of the portable terminal 100. The registration screen 800 is a screen for the user to register a frequently-used access point. In the present exemplary embodiment, if a plurality of pieces of connection information is obtained from the NFC tag 310, the portable terminal 100 automatically selects the connection information to be used, based on the result of registration on the registration screen 800.

The user inputs the SSID of a frequently-used access point into an item 802. If the user selects a registration button 803, the SSID input to the item 802 is registered (stored) in the HDD 204 of the portable terminal 100 as the frequently-used access point.

If the user selects an automatic registration button 801 on the registration screen 800, the SSID of the access point with which the portable terminal 100 is connected is registered (stored) in the HDD 204 of the portable terminal 100 as the frequently-used access point. The automatic registration button 801 saves the user the trouble of inputting the SSID. If the portable terminal 100 is not connected with an access point, the automatic registration button 801 can be displayed in a disabled state (for example, gray-out). Alternatively, the automatic registration button 801 may be hidden.

Next, processing related to a handover performed by the portable terminal 100 will be described with reference to the flowchart of FIG. 9. The steps illustrated in the flowchart of FIG. 9 are processed by the CPU 201 loading a control program stored in a memory such as the ROM 202 into the RAM 203 and executing the control program.

If the user brings the portable terminal 100 close to the NFC tag 310 of the printing apparatus 110 (touches the NFC tag 301 of the printing apparatus 110 with the portable terminal 100), the NFC reader 209 of the portable terminal 100 detects the NFC tag 310. In step S901, the CPU 201 obtains the connection information stored in the NFC tag 310 by using near field radio communication. More specifically, in step S901, the NFC reader 209 reads the tag information stored in the NFC tag 310 by using NFC. The CPU 201 then analyzes the tag information read by the NFC reader 209, whereby the CPU 201 obtains the connection information included in the tag information.

In step S902, the CPU 201 determines whether a plurality of pieces of connection information is obtained from the NFC tag 310. If the tag information read from the NFC tag 310 includes a plurality of pieces of connection information, then in step S902, a determination is made that a plurality of pieces of connection information has been obtained (YES in step S902), and the processing proceeds to step S903. On the other hand, if the tag information read from the NFC tag 310 includes a single piece of connection information, then in step S902, a determination is made that a plurality of pieces of connection information has not been obtained (NO in step S902), and the processing proceeds to step S907.

Next, step S907 will be described. In step S907, the CPU 201 controls the wireless communication unit 210 to establish wireless communication based on the connection information obtained from the NFC tag 310. In the case of step S907, the number of pieces of connection information obtained from the NFC tag 310 is one. The wireless communication unit 210 connects to the SSID included in the connection information by using the connection key included in the connection information. For example, if the SSID included in the connection information is that of the access point 120, then in step S907, wireless communication between the portable terminal 100 and the access point 120 is established.

Next, step S903 will be described. In step S903, the CPU 201 determines whether connection information for connecting to a registered access point is included in the plurality of pieces of connection information obtained from the NFC tag 310. In the present exemplary embodiment, the SSID of the frequently-used access point has been registered in the HDD 204 by using the registration screen 800. In step S903, the CPU 201 makes the determination by referring to the information registered in the HDD 204.

In step S903, if a determination is made that connection information for connecting to a registered access point is included in the plurality of pieces of connection information obtained from the NFC tag 310 (YES in step S903), the processing proceeds to step S904. In step S904, the CPU 201 selects the connection information for connecting to the registered access point as the connection information to be used for a handover from among the plurality of pieces of connection information obtained from the NFC tag 310.

In step S904, depending on the result of registration on the registration screen 800, a plurality of pieces of connection information for connecting to registered access points may be included in the plurality of pieces of connection information obtained from the NFC tag 310. In such a case, the CPU 201 selects the piece of connection information closest to the top of the tag information as the connection information to be used for a handover.

On the other hand, in step S903, if a determination is made that connection information for connecting to a registered access point is not in the plurality of pieces of connection information obtained from the NFC tag 310 (NO in step S903), the processing proceeds to step S905. In step S905, the CPU 201 selects the top of connection information among the plurality of pieces of connection information obtained from the NFC 301 as the connection information to be used for a handover.

In step S906, the CPU 201 controls the wireless communication unit 210 to establish wireless communication based on the connection information selected by the processing of step S904 or S905. The wireless communication unit 210 connects to the SSID included in the selected connection information by using the connection key included in the selected connection information.

As described above, according to the present exemplary embodiment, if a plurality of pieces of connection information is obtained from the NFC tag 310, the connection information to be used for a handover is automatically selected by the processing of step S904 or S905. This saves the user the trouble of selecting the connection information to be used for a handover even if a plurality of pieces of connection information is obtained from the NFC tag 310.

Other Exemplary Embodiments

An exemplary embodiment of the present invention may be implemented by supplying a program for implementing one or more of the functions of the foregoing exemplary embodiments to a system or an apparatus via a network or a recording medium, and reading and executing the program by one or more processors in a computer of the system or apparatus. Further, an exemplary embodiment of the present invention may be implemented by using a circuit (for example, application specific integrated circuit (ASIC)) that implements one or more of the functions.

According to an exemplary embodiment of the present invention, appropriate processing can be performed even if an information processing apparatus such as a portable terminal obtains a plurality of pieces of connection information by near field radio communication.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2014-249434, filed Dec. 9, 2014, which is hereby incorporated by reference herein in its entirety.

What is claimed is:

1. A print system including a communication terminal and a printer,
the printer including:
an NFC tag in which a plurality of SSIDs is stored with an IP address of the printer;
a printing device;
a memory that stores one or more programs; and
one or more processors that, when they execute the one or more programs, cause the communication terminal to:
print an image based on print data received via Wi-Fi, using the printing device, and
the communication terminal including:
an NFC reader that obtains information from the NFC tag;
a memory that stores one or more programs; and
one or more processors that, when they execute the one or more programs, cause the communication terminal to:
display, in a case where the information obtained from the NFC tag of the printer includes a plurality of SSIDs, a selection screen for a user to select one SSID from the plurality of SSIDs;
in accordance with the selection of one SSID by the user on the selection screen, connect to an access point corresponding to the selected SSID via Wi-Fi; and
transmit print data to the printer based on the IP address obtained from the NFC tag via the connected access point.

2. The print system according to claim 1,
wherein a message that prompts the user to select a connection destination SSID from among the plurality of SSIDs is displayed on the selection screen on the communication terminal.

3. The print system according to claim 1,
wherein the information obtained from the NFC tag is written in an NDEF (NFC Data Exchange Format), and whether the information obtained from the NFC tag includes one SSID or a plurality of SSIDs is determined by analyzing the information obtained from the NFC tag.

4. The print system according to claim 1, wherein the communication terminal is further caused to:
receive a user operation for selecting print target data; and
transmit, in accordance with connection to the access point corresponding to the selected SSID, a print job for printing the print target data to a printing apparatus via the access point.

5. The print system according to claim 1,
wherein the printer is further caused to:
receive registration of an SSID to be written in the NFC tag according to a user operation, wherein the storage device in which the SSID is to be stored is configured to store one or more SSIDs; and
generate tag information based on at least the one or more SSIDs stored in the storage device, and write the generated tag information in the NFC tag.

6. The print system according to claim 1, wherein the communication terminal is further caused to:
  in a case where the information obtained from the NFC tag of the printer includes only one SSID, connect to an access point corresponding to the one SSID without displaying the selection screen and transmit print data to the printer based on the IP address obtained from the NFC tag via the connected access point.

7. The print system according to claim 6, wherein the communication terminal is further caused to:
  determine whether the information obtained from the NFC tag of the printer includes only one SSID or the plurality of SSIDs,
  in accordance with a determination that the information obtained from the NFC tag of the printer includes the plurality of SSIDs, display the selection screen and connecte the access point corresponding to the selected SSID via Wi-Fi,
  in accordance with a determination that the information obtained from the NFC tag of the printer includes only one SSID, connect to the access point corresponding to the one SSID without displaying the selection screen.

8. A control method for controlling a print system including a communication terminal and a printer,
  the printer including an NFC tag in which a plurality of SSIDs is stored with an IP address of the printer, and a printing device, and
  the communication terminal including an NFC reader,
  the method comprising:
  obtaining, at the NFC reader, information from the NFC tag;
  displaying, in a case where the information obtained from the NFC tag of the printer includes a plurality of SSIDs, a selection screen for a user to select one SSID from the plurality of SSIDs;
  in accordance with the selection of one SSID by the user on the selection screen, connecting to an access point corresponding to the selected SSID via Wi-Fi: and
  transmitting print data to the printer based on the IP address obtained from the NFC tag via the connected access point.

9. The control method for controlling an information processing apparatus according to claim 8,
  wherein a message that prompts the user to select a connection destination SSID from among the plurality of SSIDs is displayed on the selection screen on the communication terminal.

* * * * *